United States Patent [19]

Di Stefano et al.

[11] Patent Number: 5,286,551
[45] Date of Patent: Feb. 15, 1994

[54] MATERIAL TO PAVE SKATING RINKS

[75] Inventors: Vittorio Di Stefano; Paolo Marini, both of Rome, Italy

[73] Assignee: Skitech S.r.l., Rome, Italy

[21] Appl. No.: 752,700

[22] PCT Filed: Jan. 4, 1991

[86] PCT No.: PCT/EP91/00006
§ 371 Date: Sep. 4, 1991
§ 102(e) Date: Sep. 4, 1991

[87] PCT Pub. No.: WO91/10486
PCT Pub. Date: Jul. 25, 1991

[30] Foreign Application Priority Data

Jan. 8, 1990 [IT] Italy .................. 47513 A/90

[51] Int. Cl.$^5$ .................. B32B 27/08; B32B 7/04; B05D 3/02

[52] U.S. Cl. .................. 428/216; 428/409; 428/420; 428/520; 427/372.2; 472/90

[58] Field of Search .............. 428/420, 216, 520, 409; 427/372.2; 472/90, 88

[56] References Cited

U.S. PATENT DOCUMENTS 5,141,816  8/1992  Walker et al. .................. 428/420

Primary Examiner—P. C. Sluby
Attorney, Agent, or Firm—Hedman, Gibson & Costigan

[57] ABSTRACT

Material for the paving of rinks suitable for skating with blade-skates, of synthetic type, characterized in that it exhibits a chemical composition gradient between the upper skating surface (A), consisting of hydrocarbons having a melting point of 30°–130° C., and the innermost surface (B) consisting of polymers having high mechanical properties and low brittling point.

9 Claims, No Drawings

MATERIAL TO PAVE SKATING RINKS

DESCRIPTION

The present invention relates to a material to pave skating rinks suitable for skates provided with blades. More particularly the invention relates to a material characterized by a chemical composition gradient between the upper skating surface and the inner surfaces.

BACKGROUND ART

As is known to those skilled in the field, the blade-skate skating dynamics requires that the skating surface be substantially grooved by the skate blades in order to balance the centrifugal forces generated during the movements which are typical of this sport. Thus it is indispensable that the sheeting regains the original smoothness after a certain time of use.

The smoothness of an ice surface is restorable by means of melting at relatively low costs. However, excepted the territories having a particularly cold climate, and in such territories during the warmer season, the maintenance of vast frozen surfaces involves very high investments and fixed maintenance expenses.

Owing to the above, skating rinks have been studied, which are made of synthetic materials such as Teflon (polytetrafluoroethylene), polyethylene, mixtures which include linear polyesters, the purpose being to reduce the initial investment and fixed maintenance expenses with respect to ice rinks, where ice is formed and maintained by means of cryogenic plants.

However, the surface of said materials, once it is worn out by skating, can only be restored by mechanical removal (by means of milling) of the worn out layer.

In particular, the polyethylene rinks, although they are the most economic, are quite unsatisfactory because the optimum maneuverability of blade-skates, which is only obtainable through a sufficient grooving, requires a substantial material removal for its restoration, which has proven to be uneconomical.

An improvement, as regards the problem of the costs involved in the restoring of the worn out skating surface, is disclosed in German patent application DE 3445976, which claims a water-repellent skating sheeting consisting of a mixture of saturated hydrocarbons.

In particular such sheeting is based on a mixture of waxes, polymers and copolymers of ethylene, propylene, butylene and mixtures thereof, having a melting point ranging from 30° C. to 130° C.

The materials in question are referred to, in the present specifications, as "Low-Melting Materials" or briefly "LMM". The "LMM" permit to restore the smoothness of the surface worn out by the skates by melting only the layer affected by wearing.

Such materials, however, are characterized by a high thermal expansion coefficient and exhibit poor mechanical properties; in particular a narrow elastic range, a low tensile strength, and a ductile/brittle transition temperature above 0° C.

Such characteristics make it extremely difficult to prepare a smooth surface, free from cracks and splits. This is due to the fact that, in manufacturing the skating sheeting, during the cooling from the melting temperature to the room temperature, the tensions resulting from the material shrinking cause cracks in several areas.

In order to solve said problems, the above-mentioned patent application claims a paving process consisting in laying preformed LMM tiles, i.e. already freely shrunk from the solidification temperature to the room temperature, onto particular porous substrates of inorganic nature, to which they anchor, thereby forming a prevailingly mechanical bond with said substrates.

A first problem connected with the practical use of pavings of the type claimed in the abovesaid patent application is encountered when the temperature of the LMM substrate complex drops and remains for a long time at values below $-2°$ to $-3°$ C. Under these conditions, many tiles get detached from the substrate, thus rendering the works unrealiable.

Another problem is connected with the formation and propagation of macroscopic cracks at temperatures also of a few degrees above 0° C., which are caused either by frequent temperature fluctuations around such values or by the grooving action of the skates.

The properties of both of these materials make them unfit for skating rinks.

Therefore a material for paving rinks free from the above drawbacks was needed.

DISCLOSURE OF THE INVENTION

It is an object of the present invention to provide a material for paving rinks constituted by a mixture of hydrocarbons having a melting point ranging from 30° to 130° C. with other polymers having good mechanical properties and a low ductile/brittle transition temperature.

Further objects will be evident in the detailed description of the invention.

DETAILED DESCRIPTION OF THE INVENTION

The material for the paving of rinks according to the present invention is constituted by a mixture comprising a component A and a component B, said material being characterized in that its upper layer, i.e. the skating surface, is about 100% rich in the A component and its innermost layer is about 100% rich in the B component, the composition of said material changing gradually between said two extreme layers.

The A component comprises a mixture of linear, branched, cyclic hydrocarbons and polymers and copolymers of ethylene, propylene, butylene and mixtures thereof, said mixture having a melting temperature ranging from 30° C. to 130° C. Particularly suitable are the LMM disclosed in German patent application DE 3445976.

The B component comprises polymers and copolymers soluble in the molten state with the A component and characterized by a ductile/brittle transition below the minimum temperature at which the material is used (for example below 0° C.) and having good mechanical properties such as high tensile strength and high yield stress (i.e. Impact strength $>0.1$ J/cm and ultimate elongation $>10\%$, both at 25° C.).

Particularly suitable are the polymers selected in the following group:
olefinic polymers and copolymers, i.e. of the series:
  ethylene, propylene, butylene,
copolymers of the classes:
  PECTFE (polyethylene copolymerized with chlorotrifluoroethylene)
  PEEA (polyethylene copolymerized with ethyl-acrylate)

EMA (polyethylene copolymerized with methylacrylate)

EMMA (polyethylene copolymerized with methylmethacrylate)

EVA (polyethylene copolymerized with vinyl-acetate)

mixtures among the abovesaid substances.

The polymers belonging to the abovesaid group will be referred to as "LTTP" (low ductile/brittle transition temperature polymers).

In order to reduce the ageing rate due to oxidation induced by sunlight irradiation, antiaging additives such as antioxidants and ultraviolet radiation protecting agents can be added both to the A component and to the LTTP, in proportions and by means of techniques which are well known to those skilled in the art. The material for paving rinks according to the present invention is characterized by a composition which changes gradually starting from the outer surface, rich in the A component, to the innermost surface, rich in or even containing 100% of the B component. This avoids the possibility of producing cracks onto the skating surface during its manufacturing and allows to obtain a smooth sheeting.

Moreover the presence of a high percentage of the A component in the skating sheeting allows easy and repeated repairing of the surface worn out by the skates, by means of heat, without drawbacks oxidative degradation and pyrolysis (cracking).

In order to obtain the material according to the invention characterized in that the concentration in the A component decreases as the depth of the material increases, while, consequently, the LTTP concentration increases up to 100%, the processes described hereinafter have been proven particularly effective.

A first process comprises the following steps to be carried out both at least once:

i) depositing a thin layer preferably <1 mm, more preferably <0.6 mm of molten A component onto a layer made of the B component;

ii) heating the thin layer of the A component and the underlying B component at a temperature higher than the extrusion temperature of said B component during a time of preferably 4-15 seconds.

The heating referred to in point ii) should be carefully carried out in order to avoid surface oxidation.

By repeating the two steps it is possible to obtain thicker layers having a gradual changing of the composition and an upper surface richer and richer in A, until—after 3 to 5 cycles—there is nothing to do but adding a thicker layer of pure A to the upper surface of the non-homogeneous layer. Another process to obtain the material according to the invention is described hereinbelow.

A melt of the A component is poured onto a layer of the B component preheated at a temperature preferably just below its extrusion temperature, thus obtaining a layer of A preferably higher than 1 mm; then the material is made to cool slowly to room temperature.

In order to illustrate the present invention, but without limiting it, the above-mentioned processes have been carried into effect by using the following starting materials.

EXAMPLE I

A component: a mixture 60/40% wt. of a paraffin having melting point of 58° C. and a polyethylene wax having melting point of 110° C.;

B component: a polyethylene having a mean m.w. 500,000 and Impact strength of about 10 J/cm at 25° C.

The B component was firmly fixed onto a concrete floor in order to avoid distortions caused by thermal expansion and preheated at a temperature of about 50° C.

The A component was heated at about 230° C. and poured onto B in a layer of about 3 mm.

Then the material was allowed to cool slowly to room temperature in about 45 min.

EXAMPLE II

A component: a low melt point material (LMM), constituted by a microcrystalline paraffin resin having a melting point of 64° C. B component: a high density polyethylene having a MFI/190/2.16 equal to 1 g/10 min (melt flow index at 190° C. and 2.16 kg of applied force, measured according to ASTM 1238 standard) and a brittling point of −40° C.

20 mm thick plates of such material were preferably fixed to a previously prepared concrete paving in order to form a continuous surface.

A thin layer of molten A component (at about 180° C.) was deposited onto the polyethylene surface.

Then the thin layer of A and the underlying polyethylene surface were heated at about 230° C. for a time of 4-15 seconds. It was found that it is particularly convenient to melt the A component in a proper vessel and then to spray it onto the polyethylene surface according to the same technique which is used for spraying paints by means of airless guns, thereby obtaining, as a function of the fluidity and therefore of the A temperature, layers having a thickness typically ranging from 0.1 to 0.4 mm.

It was also found to be suitable to use, as a heat source, the direct flame of a liner burner of gaseous fuel (L.P.G. and the methane gas).

The composition gradient along the thickness of the layer so obtained was revealed by drawing samples of material by means of core boring and by measuring the hardness variation in different points of the samples by means of a microdurometer. In fact, for these types of materials hardness is a fairly additive property, so that the hardness of mixtures turns out to be proportionally intermediate between the different hardness value of the components. The above-mentioned test provides excellent results if it is conducted at a temperature around 30° C. below the melting point of the adopted A component. At such temperatures, in fact, the hardness difference between A and the pure LTTP is considerable and it is particularly easy to check the hardness variation associated with the concentration gradient along the sample thickness.

Experience has proven that paving comprising a layer with the non-homogeneous composition does not give A-B rise to spontaneous detachments or propagates cracks caused by impacts, at least up to temperatures of −20° C.

We claim:

1. A material for the paving of rinks, said material having an upper skating surface layer and a lower layer, wherein the upper skating surface layer is about 100% rich in an A component and the said lower layer is about 100% rich in a B component and the composition of said material changing gradually between said upper skating surface layer and said lower layer; the A component having a melting temperature ranging from 30° C. to 130° C. and consisting of at least a compound selected from the group consisting of linear, branched or cyclic hydrocarbons, polymers and copolymers of ethylene, propylene, butylene and mixtures thereof; the B component consisting of a mixture of polymers and copolymers which are soluble in A when it is in the molten state and have a ductile/brittle transition temperature below the temperature at which the material is used.

2. The material according to claim 1, wherein the B component consists of a compound selected among:
   olefinic polymers and copolymers;
   copolymers of:
     polyethylene and chloro-trifluoroethylene;
     polyethylene and ethyl-acrylate;
     polyethylene and methyl-acrylate;
     polyethylene and methyl-methacrylate;
     polyethylene and vinyl-acetate;
   and mixtures thereof.

3. Rink suitable for skates provided with blades said rink being made of a material having an upper skating surface layer and an innermost layer, wherein the upper skating surface layer is about 100% rich in an A component and the innermost layer is about 100% rich in a B component and the composition of said material changing gradually between said two extreme layers; the A component having a melting temperature ranging from 30° C. to 130° C. and consisting of a compound selected from the group consisting of linear, branched or cyclic hydrocarbons, polymers and copolymers of ethylene, propylene, butylene and mixtures thereof; the B component consisting of a mixture of polymers and copolymers which are soluble in A when it is in the molten state and have a ductile/brittle transition temperature below the temperature at which the material is used.

4. A rink as defined in claim 3 wherein the A component is polyethylene wax having a melting point of 110° C. and the B component is polyethylene.

5. A process to obtain a material for the paving of rinks, said material having an upper skating surface layer and a lower layer, wherein said upper skating surface layer is about 100% rich in a B component and the composition of said material changing gradually between said two extreme layers; said process consisting of the following steps to be carried out both at least once:
   i) depositing a layer of molten A component onto a layer made of the B component, the thickness of the layer of the A component being <1 mm;
   ii) heating the layer of the A component and the underlying B component at a temperature higher than the extrusion temperature of said B component.

6. A process according to claim 5 wherein the layer of the A component in the step i is <0.6 mm.

7. A process according to claim 5 wherein the heating referred to in step ii is carried out for a time of 4–15 seconds.

8. A process to obtain a material for the paving of rinks, said material having an upper skating surface layer and lower layer, wherein the upper skating surface layer is about 100% rich in an A component and said lower layer is about 100% rich in a B component and the composition of said material changing gradually between said two extreme layers; said process comprising the following steps:
   a melt of the A component is poured onto a layer of the B component preheated at a temperature just below its extrusion temperature;
   the material is made to cool slowly to room temperature.

9. A process according to claim 8 wherein the layer of the A component is thicker than 1 mm.

* * * * *